Sept. 1, 1953 W. B. FEHRING 2,650,782
LANDING UNIT FOR AIRCRAFT
Filed Sept. 18, 1951 3 Sheets-Sheet 1
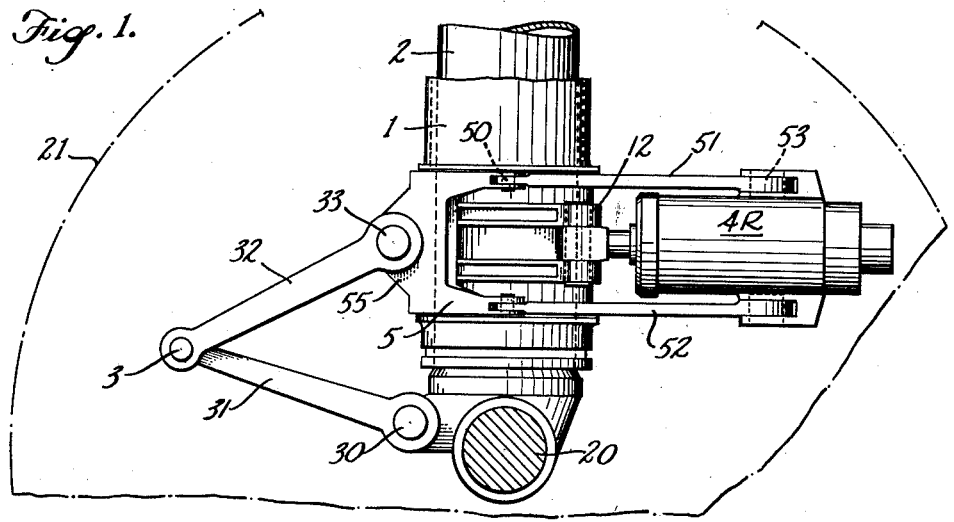
Fig. 1.
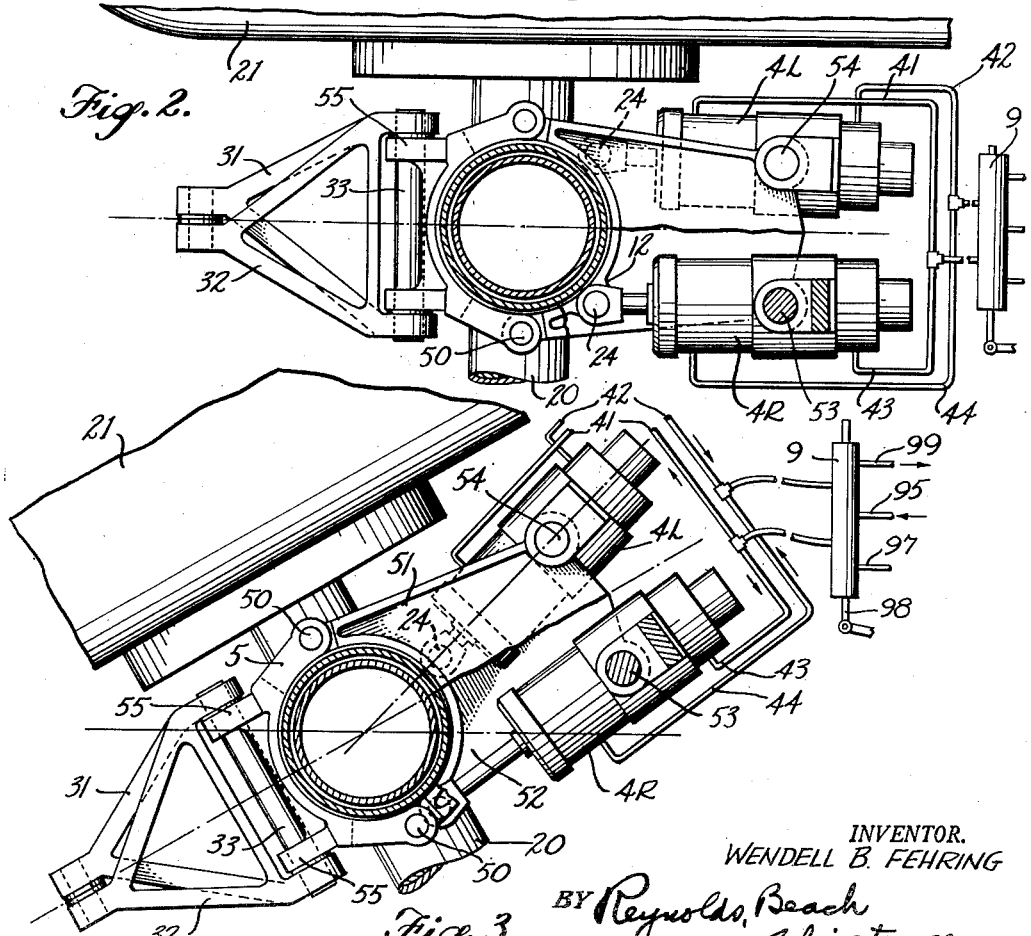
Fig. 2.
Fig. 3.
INVENTOR.
WENDELL B. FEHRING
BY Reynolds, Beach
& Christensen
ATTORNEYS

INVENTOR.
WENDELL B. FEHRING

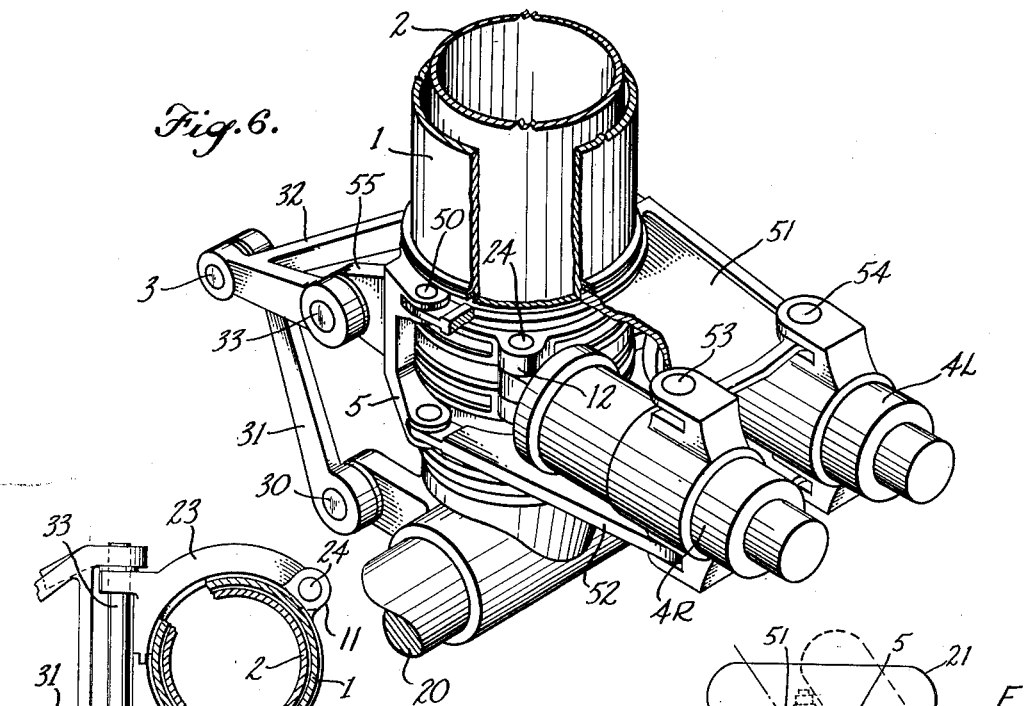
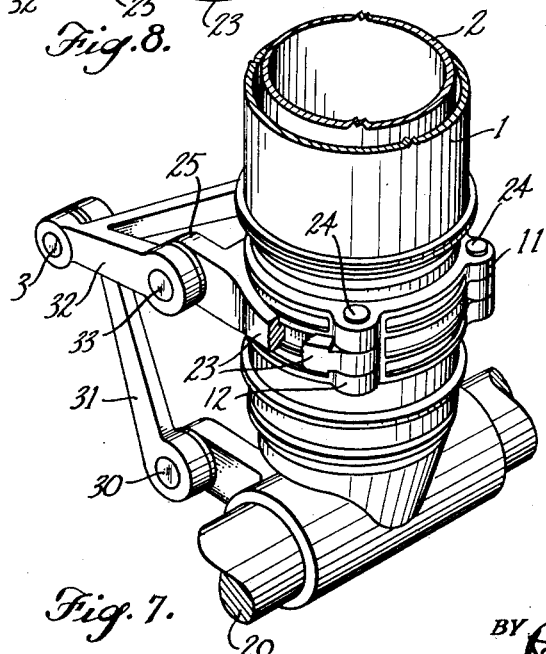
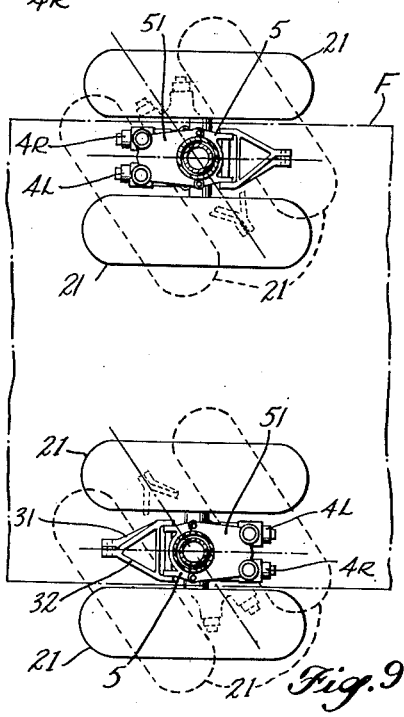

Patented Sept. 1, 1953

2,650,782

UNITED STATES PATENT OFFICE 2,650,782

LANDING UNIT FOR AIRCRAFT

Wendell B. Fehring, Seattle, Wash., assignor to Boeing Airplane Company, Seattle, Wash., a corporation of Delaware Application September 18, 1951, Serial No. 247,061

10 Claims. (Cl. 244—50)

The present invention concerns a landing unit, meaning by the latter term an assembly which includes a shock strut, the ground-engaging element or elements, usually a wheel or, in this case, dual wheels, and mechanism associated between the relatively telescoping parts of the shock strut, whereby they may be free at all times when ground-borne to move axially, one relative to another, and whereby they may be fixed against relative rotation, or alternatively, at will, relative rotation between them may be accomplished or controlled, as, for example, where the strut is used to mount steerable wheels of an aircraft.

The present invention is particularly designed as a landing unit for inclusion in a quadricycle landing gear, such as is disclosed and claimed in the companion application of William H. Schlender, Serial No. 238,876, filed July 27, 1951. According to the Schlender invention, the entire load of an airplane, in touching down or in taxying, is assumed by four landing units arranged in a fore pair and in a rear pair, respectively, the units of each pair being supported directly upon the fuselage, and being spread widely apart at opposite sides of the longitudinal vertical central plane of the fuselage, when such landing units are extended, to afford a stable base of support, without reliance on wing-mounted units. It is obvious that the forward landing units in such a quadricycle landing gear should be steerable, and that the rear landing units should be nonrotative, or fixed in the straight-ahead position. It is obvious also that if each one of the landing units were basically of identical design, this would greatly simplify manufacturing and replacement problems.

It is a primary object of this invention to provide a landing unit which is of a basic design capable of being used in any one of the four locations in such a quadricycle landing gear, and convertible readily and by simple mechanism, according to where it is installed, from a nonrotative landing unit to a steerable or rotative landing unit, or vice versa.

It is a further object to provide in the landing unit, when arranged for steering, simple mechanism to accomplish the steering thereof, and to do this through the employment of two fluid-pressure-actuated steering jacks, so connected, and the application of fluid pressure so controlled, that when fluid pressure is applied simultaneously to the two paired jacks the desired rotative steering movement is accomplished in accordance with the direction of application of the pressure fluid to each thereof, as regulated by suitable valve means.

It is also an object to provide such paired landing units arranged for steering by the simple application of pressure equally and simultaneously to the two landing units, and as mentioned above, controlling the direction of steering by the direction of application of the pressure fluid to the jacks of the two paired units.

It is also an object to provide such a landing unit incorporating steering jacks in which the steering jacks and the associated mechanism may be located compactly between the two ground-contacting elements, such, for instance, as dual wheels, which are located at respectively opposite sides of the shock strut.

With such objects in mind, and others as will appear hereinafter, the present invention comprises the novel landing unit, and the novel combination and arrangement of the same either for straight-ahead movement or for steering movement, and basically as prepared to receive either such type of connection, all as is shown in the accompanying drawings and as will be more fully pointed out hereinafter in this specification, and as defined in the claims.

Figure 1 is a side elevational view, with the transverse spindle in section, and the ground contacting elements omitted, showing the lower portion of such a landing strut.

Figure 2 is a plan view of the mechanism shown in Figure 2, the upright cylinders of the strut being shown in section, and all parts, although arranged for steering, being positioned in the straight-ahead position, whereas Figure 3 is a view similar to Figure 2, but showing parts in a rotated steering position.

Figure 6 is an isometric view of the mechanism shown in Figures 1, 2, and 3, with parts broken back for clearer illustration of concealed parts.

Figure 7 is an isometric view similar to Figure 6, but showing the parts arranged for nonrotative, straight-ahead movement, and Figure 8 is a transverse sectional view through the upright cylinders of the shock strut, illustrating certain details of the nonrotative shock strut.

Figure 9 is a top plan view of a pair of such shock struts, illustrating their relationship to the fuselage and to one another, the parts being arranged for steering movement. The relative arrangement of the landing units in Figure 9 corresponds to the principles of the Schlender invention, referred to hereinabove.

Figure 4:
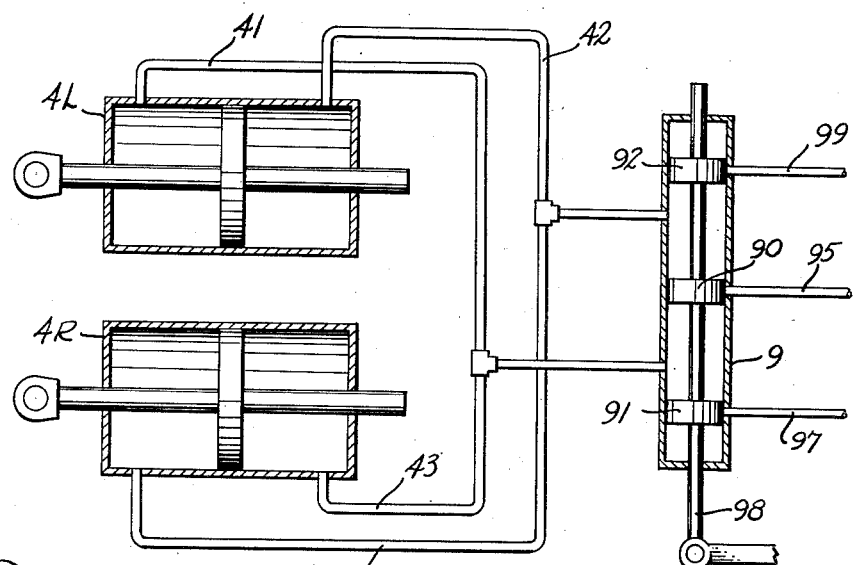
Figure 4 is a diagrammatic sectional view of the steering valve, positioned in a neutral or non-rotated position.

Basically, the landing unit includes an upright cylinder 1, concentrically disposed relative to a second upright cylinder 2, these two cylinders being interconnected for relative telescoping or axial movement, as is usual in shock struts, and in the basic design being capable of relative rotative movement. Mechanism is provided for absorbing and damping relative axial movement, but since such mechanism is known and constitutes no part of the present invention, the showing thereof has been omitted. It is theoretically immaterial whether the inner or the outer of these cylinders is the fixed or non-rotative one, although preferably the outer cylinder 1 will be the nonrotative cylinder, and the inner cylinder 2, is the rotative one.

Parenthetically, it may be remarked that the reference to the cylinders 1 and 2 as upright has reference to their disposition in operative position, for normally they would be retractive within the confines of the aircraft, when the aircraft is in flight. Means to that end is disclosed in the Schlender application.

The rotative cylinder 2 carries at its lower end a transverse spindle 20, on the opposite ends of which are journaled ground-contacting rotative elements, such as the wheels 21. It is normal practice, when it is desired to prevent relative rotation of two such cylinders, or deviation of the wheel carried thereby from a straight-ahead path, to interconnect the two relatively axially movable cylinders by standard torsion links, represented here at 31 and 32, which are pivotally connected together at 3, and the lower of which is connected by a similar axis 30 to the rotative cylinder 2, in the vicinity of the spindle 20. Ordinarily the upper link 32 would be connected directly to the nonrotative cylinder, in this instance 1, but the connection according to this invention is more or less direct, or rather indirect, depending on whether the landing unit is to be fixed in the straight-ahead position or is to be employed for steering. If it is to be employed for steering, the connection is indirectly through steering mechanism, such as would include, for example, the steering jacks 4R and 4L. The letters suffixed to the numerals indicate that these steering cylinders are at the right and left, respectively, but since the unit may be employed at one time with the steering cylinders directed forwardly, and at another time with these cylinders directed rearwardly, the position of the respective jacks 4L and 4R may be reversed.

The outer nonrotative cylinder 1 is provided with fixed anchorage means, which preferably include two bosses 11 and 12. These bosses are angularly spaced apart, symmetrically of a plane which includes the axes of the cylinders 1 and 2 and which is normal to the axis of the spindle 20, but both lie preferably at the same side of a plane which includes the axes of the cylinders 1 and 2 and also the axis of the spindle 20; in other words, a plane which is at right angles to the plane first mentioned. Anything fixed to these anchorage bosses 11, 12 of the nonrotative cylinder 1 is fixed against rotation.

The rotative cylinder 2 is so fixed against rotation, in the arrangement shown in Figures 7 and 8, the connection being by means of a collar (which may be formed in two parts for convenience in assembly) 23, which encircles the cylinder 1, and which is provided with further bosses 25 for transverse pivotal connection, by means of the pin 33, to the upper free end of the upper torsion link 32. Since the torsion links are connected to the rotative cylinder 2, through the connection at 30, and are connected now at 33 to the non-rotative collar 23 which is secured to the nonrotative cylinder 1, it is obvious that rotation of the cylinder 2 is no longer possible. Alternatively, when rotation of the rotative cylinder 2 is desired, instead of anchoring the upper torsion link 32 in the manner just described, this torsion link 32 should be connected at 33, in the manner shown in Figures 1, 2, 3, 6 and 9, to pivot bosses 55 carried by a collar 5 which replaces the collar 23. The collar 5 encircles, at least partially, the non-rotative outer cylinder 1, and itself can rotate about the cylinder 1. The collar 5 is not anchored to the fixed bosses 11, 12 of the non-rotative cylinder 1, but instead the respective plungers of the two steering jacks 4L and 4R are anchored to there bosses, and hence to the non-rotative cylinder 1, by the pivot pins 24. The cylinders of these steering jacks are pivotally mounted at anchorage points 54, 53, respectively, upon upper and lower steering plates 51, 52, and these steering plates in turn are connected at 50, on each side, to the collar 5, and in effect complete the collar, which now may rotate about the non-rotative cylinder 1. The fixed bosses 11, 12 on the non-rotative cylinder 1 still constitute fixed reaction or anchorage points, but by reason of the extensible and contractible steering jacks 4L, 4R interposed between the same and the rotative cylinder 2 by way of the torsion links 32, 31, the rotated position of the cylinder 2, hence of the wheels 21, is governed by the degree of actuation of the steering cylinders 4L, 4R, away from a neutral or straight-ahead position.

The manner and point of connection of the steering jacks to the fixed bosses assume some importance. The steering jacks are supported between the upper and lower steering plates 51 and 52, and more or less parallel one to another. The respective cylinders of these steering jacks are pivotally connected at 53 and 54 upon the steering plates, and their plungers are similarly pivotally connected at 24 to the bosses 11, 12. The bosses 11, 12 are angularly spaced apart, and disposed in particular relationship to two planes which include the common axis of the cylinders 1 and 2, as has already been explained, and the points 53 and 54 are similarly located and spaced apart, but at appreciably greater radial distances from the axis of the cylinders 1 and 2, and at considerably less angular spacing apart than the bosses 11, 12, so that the pivot 53 and one of the pivots 24 at the boss 12 and the pivot 54 and the other of the pivots 24 at the boss 11 will lie along parallel longitudinal lines. In other words, the axes of the steering cylinders 4R and 4L are generally parallel, particularly in the straight-ahead position, but more or less so in all operative positions, and the cylinders are disposed between the dual landing wheels 21.

It will now be evident that by properly supplying pressure fluid to one or to both of the steering jacks 4L and 4R, they will react from the fixed bosses 11, 12 to effect separation between one of these bosses and one of the pivot points 53 or 54, according to the direction of supply of the pressure fluid, and the plates 51, 52 being connected to the rotative cylinder 2 through the torsion links 31, 32, will effect steering movement of the rotative cylinder 2.

Figure 5:
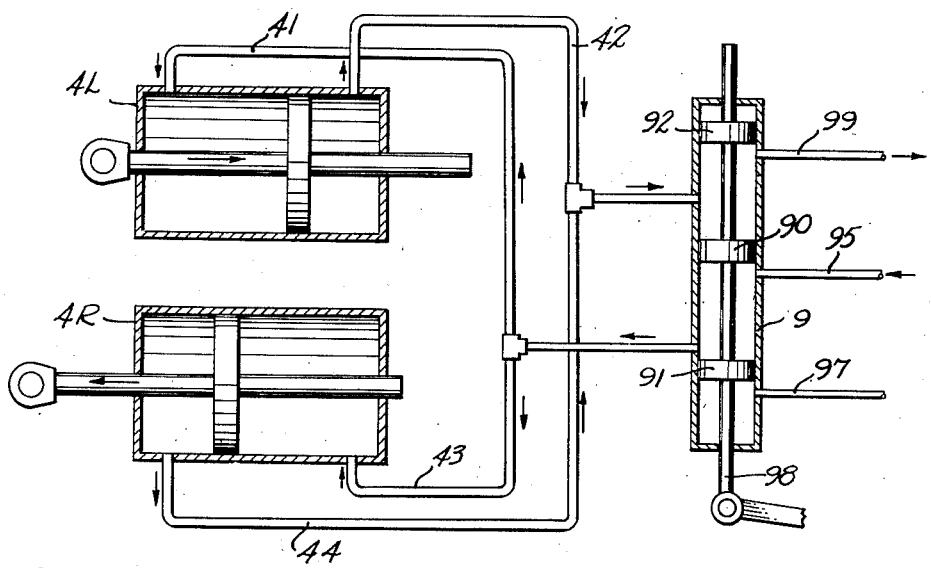
Figure 5 is a similar view showing the valve in position for steering corresponding to Figure 3.

Any suitable valve means may be employed to control the steering; that shown is merely intended to suggest a workable form. A valve cylinder 9 slidably receives a valve having connected lands 90, 91, and 92, shiftable together by the valve rod 98 under control. Pressure fluid supplied at 95 is cut off by the land 90 when parts are in the neutral position (Figures 2 and 4). When the valve body is shifted rightwardly to an operative position, as viewed in Figure 5, the pressure fluid flows by way of the valve cylinder and line 41 to the inner end of steering jack 4L, displacing that jack's cylinder (its piston and plunger being fixedly anchored) to the left, and shortening the jack 4L. Simultaneously fluid flows by way of branch line 43 to the outer end of steering jack 4R, displacing its cylinder to the right—to extend steering jack 4R. The rightward shift of the valve body uncovers return ports 97 and 99, and the opposite ends of the cylinders of jacks 4L and 4R are vented by way of passages 42, 44, respectively.

Assuming parts to be initially in the neutral or straight-ahead position of Figure 2, the result of shortening the steering jack 4L and of extending the companion steering jack 4R is that these jacks initially cooperate to turn the wheel spindle towards the position of Figure 3. This might entail a right turn or a left turn, depending upon the placement of the steering mechanism relative to the fuselage. Eventually if the supply of pressure fluid continues and the parts are not mechanically stopped, the pivot point 54 may pass so far with relation to a line joining it and the anchorage point at 24 that this line passes through and beyond the axis of the upright cylinders 1 and 2. Further movement causes resistance in the jack 4L to the movement which the jack 4R tends to accomplish. This, however, is not objectionable, first, because by now the parts are in such position that the leverage of the jack 4R is greatly in excess of the leverage of the jack 4L, consequently the jack 4R controls, and further, such resistance as is produced in the jack 4L serves merely to slow down and cushion the steering movement near the extreme limit thereof. In similar fashion, if the valve body is shifted in the opposite sense from Figure 5, pressure fluid is supplied by way of the ducts 42 and 44, and parts tend to swing toward the opposite steering position from that shown in Figure 3.

It is evident that basically the landing unit is capable of use either in a straight-ahead position or for steering, and that the change from one condition to the other is readily accomplished, as, for example, by dismounting the collar 23 and mounting the collar 5 and the anchorage plates 51, 52, or vice versa. The entire steering mechanism may be mounted as a unit sub-assembly, making change-over exceedingly simple. But one basic landing strut need be stocked, simplifying procurement and replacement.

It will likewise be apparent that the jacks 4L and 4R might be constructed otherwise than as fluid-pressure-actuated, for instance, as mechanically actuated, particularly if provision is made to prevent their moving past dead center, or the jacks 4L and 4R might be shimmy-damping cylinders.

It will be observed in Figure 9 that at one side of the fuselage, represented at F, the steering cylinders are directed rearwardly, with the torsion links of that unit directed forwardly, whereas the parts are reversely directed at the opposite side of the fuselage. Each landing unit would be mounted ordinarily for retraction, and the mounting means to this end, and the retracting means, are shown in detail in the companion Schlender application, to which reference is made for such details, which are not pertinent here.

I claim as my invention:

1. A landing unit for aircraft for installation alternatively for steering or for straight-ahead movement, comprising two generally upright cylinders concentrically disposed and relatively axially movable, one being non-rotative and the other being rotative relative to the non-rotative cylinder, a ground-contacting element mounted upon and for rotation with the lower end of said rotative cylinder, an upper and a lower torsion link pivotally connected together along a transverse axis joining their adjoining ends, pivot means similarly connecting the lower link at its lower end to the rotative cylinder, two anchorage means spaced circumferentially about and fixedly secured to the non-rotative cylinder, a support separate from both cylinders and pivotally connected to the upper end of the upper torsion link, similarly to the connection of the lower end of the lower link to the rotative cylinder, and means operatively connecting said separate support to said two fixed anchorage means, either directly in order to prevent relative rotation of the two cylinders, or indirectly through angularly adjustable steering means in order to effect controlled relative rotation between the cylinders, the two cylinders being free in either case to move relatively axially, in any relative angular position.

2. A landing unit as in claim 1, arranged for straight-ahead movement, wherein the separate member is formed to encircle the non-rotative cylinder, and for securement directly to the two anchorage means thereon at the two angularly spaced points.

3. A landing unit as in claim 1, arranged for steering movement, including force-transmitting means mounted for rotation about the non-rotative cylinder, and whereto the separate member is fixedly secured, and steering jack means directly interposed between the anchorage means on the non-rotative cylinder and anchorage means on said rotative force-transmitting means, to communicate a rotative force to the latter and thence to the rotative cylinder by way of the torsion links.

4. A landing unit as in claim 1, the two anchorage means upon the non-rotative cylinder consisting of two angularly separated bosses, further anchorage means including two similarly angularly spaced bosses carried by the separate member, said separate member being mounted upon the non-rotative cylinder for rotation thereabout, and two complemental steering jacks, each extensible and contractible in length, each connected at one end to a boss upon the non-rotative cylinder and at its other end to a boss upon the separate member, for rotation of the rotative cylinder through the separate member and the torsion links, by reaction from the non-rotative cylinder.

5. A landing unit as in claim 1, wherein the ground-contacting element is divided into dual elements rotatable in parallel upright planes alongside opposite sides of the cylinders, and wherein the anchorage means upon the non-rotative cylinder consist of two bosses both located between said dual elements, and at one side of a transverse plane axially of the cylinders, and equidistantly spaced from a fore-and-aft plane axially of the cylinders, two additional bosses on the separate member similarly located and spaced apart, and generally in longitudinal alignment with the respective first-mentioned bosses, and two complemental steering jacks, each extensible and contractible under control, and each connected at one end to a boss upon the non-rotative cylinder and at its other end to the corresponding boss upon the second member, respectively, to lie in generally parallel relationship intermediate the dual ground-contacting elements in all operative positions of the parts.

6. The combination of claim 5, wherein the steering jacks are fluid-pressure-actuated, including control valve means for pressure fluid, conduit means extending thence to a given end of one jack and to the opposite end of the other jack, for supply of pressure fluid simultaneously to the two so-connected ends, conduit means connecting the two remaining ends of the two jacks by way of the valve means, for simultaneous supply of pressure fluid thereto, and consequent reverse actuation of the jacks, and said control valve means including means for venting the ends of the jacks which are opposite the pressurized ends, respectively.

7. The combination of claim 6, wherein the anchorage means are relatively located to shift each steering jack, during its contraction, past a dead center position with respect to the common steering axis of the upright cylinders, and the expanding jack to a position of maximum leverage, whereupon the contracting jack resists the action of the expanding jack, but with lesser leverage until parts are returned to or again past the dead center position.

8. A landing unit for aircraft comprising two generally upright cylinders concentrically disposed and relatively axially movable, one being non-rotative and the other being rotative relative to the non-rotative cylinder, a transverse spindle at the lower end of the rotative cylinder, two landing wheels journaled upon the opposite ends of said spindle, spaced apart at opposite sides of the cylinders, two bosses fixed to the non-rotative cylinder and spaced apart by a given angular amount at the same side of a first plane defined by the axes of the cylinders and of the spindle, but symmetrically at opposite sides of a second plane which includes the axis of the cylinders but is normal to the axis of the spindle, an anchor plate secured to the rotative cylinder, and formed with two bosses at the same side of the first plane as the first-mentioned bosses, located radially farther from the axis of the cylinders than said first-mentioned bosses, but spaced apart by a lesser angular amount, to lie each in a line with its corresponding first-mentioned boss, which line is generally parallel to the line joining the other two bosses, a fluid-pressure-actuated steering jack joining each pair of bosses along the respective lines and located between the two landing wheels, and articulated torsion links joining the rotative cylinder with the anchor plate, to transmit steering torque to the rotative cylinder from the jacks, reacting from the non-rotative cylinder, in any relative axial positions of the two cylinders.

9. A landing unit for aircraft comprising two generally upright cylinders concentrically disposed and relatively axially movable, one being non-rotative and the other being rotative relative to the non-rotative cylinder, a ground-contacting element mounted upon the lower end of said rotative cylinder, an upper and a lower torsion link pivotally connected along a transverse axis by the adjoining ends of the two links, the lower link being similarly pivotally connected at its lower end to the rotative cylinder, two angularly spaced anchorage means carried by said non-rotative cylinder, and alternatively usable means interconnecting said anchorage means and the upper end of the upper torsion link, one such means comprising a connecting element securable to said anchorage means and thereby secured rigidly to the non-rotative cylinder, and pivotably to the upper end of the upper torsion link, to secure the rotative cylinder, by way of said torsion links, against rotation relative to the non-rotative cylinder, while permitting their relative axial movement, the other such means comprising a collar rotatively mounted upon the non-rotative cylinder and pivotably secured to the upper end of the upper torsion link, two anchorage means, angularly spaced, carried by said collar, and two steering jacks interconnecting each of two anchorage means, one on the collar and another on the non-rotative cylinder, respectively, for controlled rotation of the rotative cylinder relative to the non-rotative cylinder, while permitting their relative axial movement in any relatively rotated position, and whereby one such landing unit may be installed interchangeably either for steering or for straight-ahead movement only.

10. A landing unit for aircraft comprising a non-rotative, generally upright cylinder and a second cylinder rotatively and telescopingly mounted concentrically of said non-rotative cylinder, a ground-contacting element mounted upon the lower end of said rotatively mounted cylinder, an upper torsion link and a lower torsion link pivotally connected together along a transverse axis, the lower link being pivoted at its free end along a transverse axis to the rotatively mounted cylinder, a collar removably fixed to the non-rotative cylinder, and transverse pivot means to secure the free end of the upper torsion link to said collar, to secure the two cylinders against relative rotation through the torsion links, while enabling relative axial movement of the cylinders.

WENDELL B. FEHRING.

References Cited in the file of this patent
UNITED STATES PATENTS

| Number | Name | Date |
|---|---|---|
| 2,211,484 | Warner | Aug. 13, 1940 |
| 2,372,710 | Chisholm | Apr. 3, 1945 |